United States Patent [19]
Richez

[11] 3,937,884
[45] Feb. 10, 1976

[54] DECODING EQUIPMENT ESPECIALLY FOR A TYPEWRITER INTENDED FOR HANDICAPPED PERSONS

[75] Inventor: Jean Richez, Geneva, Switzerland

[73] Assignee: Rotary Club Geneve SUD, Carouge, Switzerland

[22] Filed: July 2, 1974

[21] Appl. No.: 485,980

[52] U.S. Cl. ............................ 179/1 SE; 178/81
[51] Int. Cl.² ......................................... G10L 1/16
[58] Field of Search ........... 179/1 VC, 1 SE, 15 BV; 340/166 R; 178/26 R, 23 R, 79, 80, 81

[56] References Cited
UNITED STATES PATENTS

| | | | |
|---|---|---|---|
| 2,921,133 | 1/1960 | Kalfaian | 179/1 SE |
| 3,261,916 | 7/1966 | Bakis | 179/1 SE |
| 3,831,147 | 8/1974 | Kafafian | 340/166 R |

Primary Examiner—Thomas A. Robinson
Attorney, Agent, or Firm—Young & Thompson

[57] ABSTRACT

Code control equipment especially for a typewriter intended for handicapped persons comprising a receiver of control signals having short and long impulses, a decoder, and circuits able to control various functions, characterised in that it comprises electronic integrating equipment, memory store equipment and comparison equipment which interprets for each coded control signal the significance of each element of the coded signal so that the control of functions is rendered practically independent of the rate at which the elements of the coded signal are given and of their absolute duration.

12 Claims, 3 Drawing Figures

DECODING EQUIPMENT ESPECIALLY FOR A TYPEWRITER INTENDED FOR HANDICAPPED PERSONS

The object of this invention is to provide a control for a typewriter, which is very simple to actuate and requires only minimal movement. Such machines are intended especially for invalids, paralytics, paraplegics, and so on, who are very restricted in the movements they are able to make.

There are typewriters which can be actuated by the mouth, for example by a coded sequence of compressions and decompressions of the air in a pipe which can be created by the operator's inhalations and exhalations.

The disadvantage in existing machines is due to the fact that the operator has to maintain a rate imposed by the machine for the succession of compressions or decompressions, so as not to disturb the control code.

It happens that most patients are unable to keep to such a working rate and rapidly experience an intolerable fatigue, so that they perform a controlling operation which does not conform to the required code and cause error in the operation of the machine.

Another disadvantage of such machines is that the operator has to be in physical contact with part of the machine, a condition that often imposes an uncomfortable position on the patient, which he is unable to maintain for more than a short period of time.

The control equipment according to the present invention seeks to overcome these disadvantages. It comprises a receiver of control signals having short and long impulses, for example of the Morse type, a decoder, and circuits able to control the various functions of the typewriter, and is characterised by the fact that it comprises electronic equipment for integration, memory storage, and comparison for interpreting for each coded control signal the significance of each element of the coded signal, so that the control of the machine is rendered practically independent of the rate at which the coded signal elements are given, and of their absolute duration.

The attached drawings show schematically and by way of example one embodiment of the control equipment according to the invention.

The control equipment is particularly suitable for controlling an electric typewriter of the kind which comprises a distinct control element, for example an electro-magnet, for each machine function.

Typewriter 1 is for example an "Olympia" electric typewriter and control equipment 2 is placed in a cabinet 3 while the receiver or control means 4 consists of a microphone. In an alternative embodiment this receiver can consist of a microswitch for example requiring only a very slight movement on the part of the operator.

In the example shown the receiver is a microphone sensitive to hissings or fricatives which are acoustic signals sounding as fff, sss, shshsh, and so on.

Figure 1:
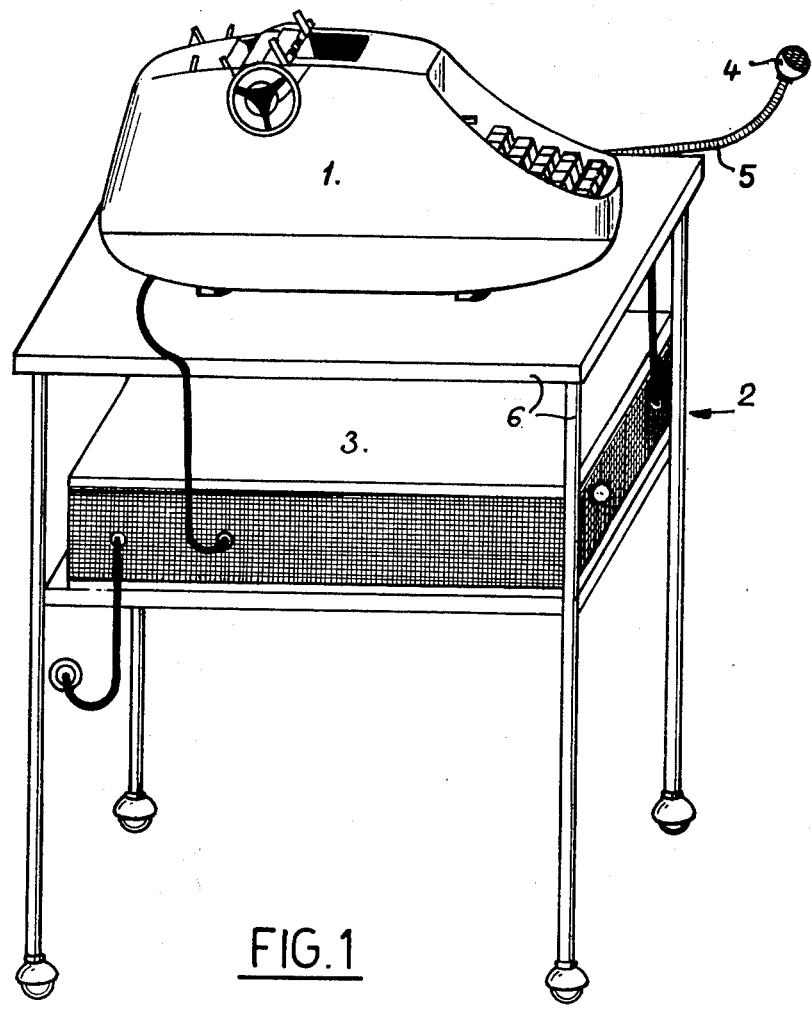
FIG. 1 shows a general perspective view of a typewriter and its control equipment.

As shown in FIG. 1 the whole machine 1 and control equipment 2 is mounted on a wheeled support 6 and the microphone 4 is carried on a flexible arm 5 so that the machine can easily be transported to an operator who is in bed or confined to a wheelchair so that he can see what the typewriter has written and can easily direct his sounds to the microphone 4.

This machine allows a handicapped person to typewrite and, as can easily be seen, also to operate various equipment at a distance. It is actuated by a succession of short and long signals, "dots" and "dashes" of the Morse type, which can be produced by light movement of a limb (use of microswitch) or by acoustic signals (use of microphone).

Figure 2:
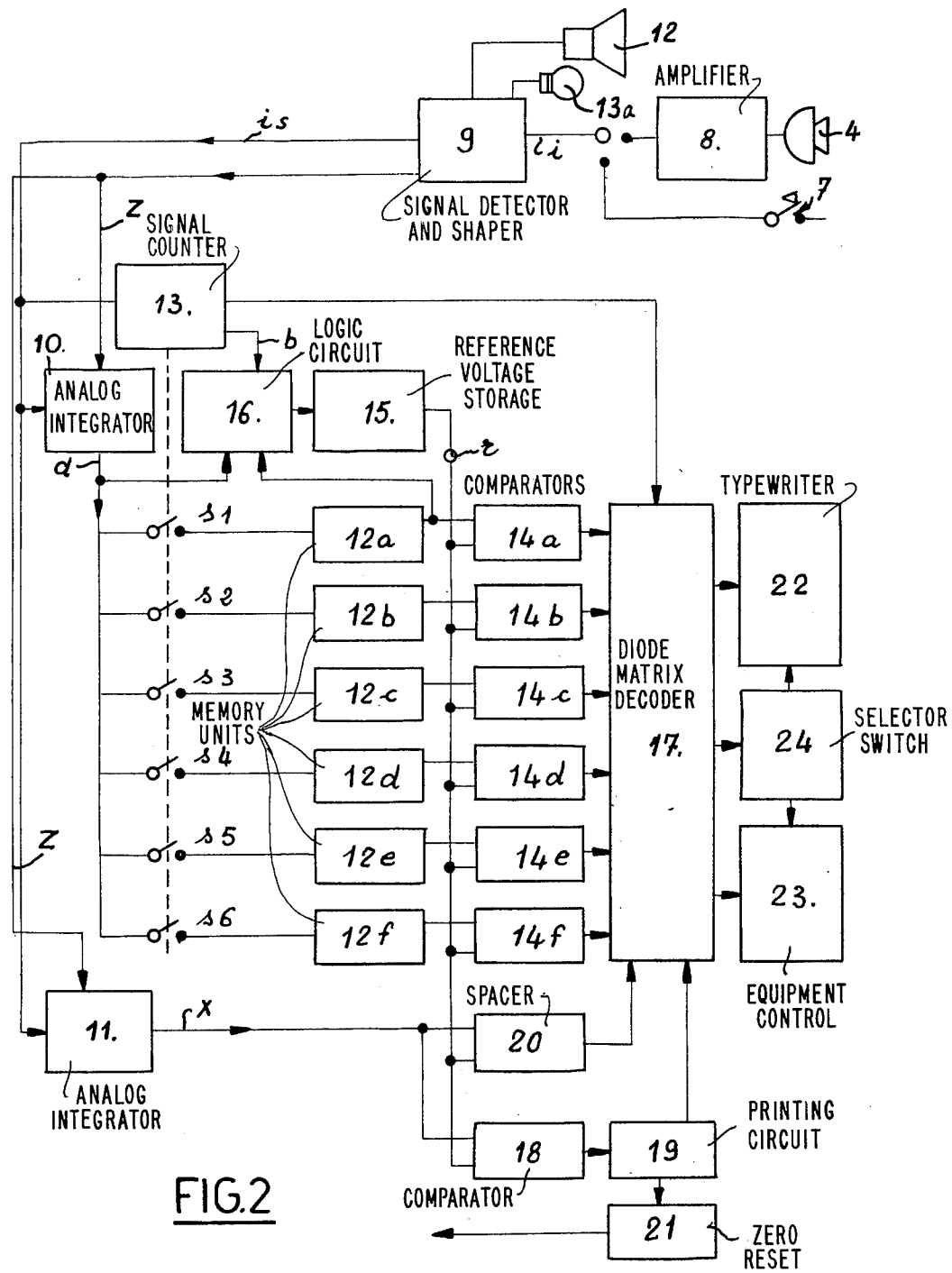
FIG. 2 is a block diagram of the control equipment.

Referring to FIG. 2, control signal i can be provided either by the operation of a microswitch 7 or by the microphone 4. In the latter case, the signal from the microphone is passed to a high-pass amplifier 8 having a cut-off frequency for example of the order of 8–12 kHz so that the hissing signals are amplified but frequencies contained in an ordinary conversation are not, so that the machine is insensitive to a conversation held a few centimeters from the microphone. Control signals $i$ are detected and shaped in 9 so as to produce impulses of level and polarity suitable for driving two analogue integrators 10 and 11.

Additionally the shaping circuit drives an audio-frequency oscillator and hence a loud-speaker 12, and/or a lamp 13a, reproducing the control signals $i$ so that the user may have a visible or audible control of the manner in which he controls the machine.

Integrator 10 integrates the duration of the shaped elements of the control signal $i_s$. It retains its level during the interval between two successive elements of a signal. A control signal can have at the most six successive "dash" or "dot" elements.

The second integrator 11 integrates the duration of the spaces between the elements of a control signal and is put at zero at the beginning of each of the elements by a signal z provided by the shaping circuit. This latter also resets integrator 10 to zero at the beginning of each element of the control signal.

The two integrators 10 and 11 are of the Miller type and can be made with currently available operational amplifiers for example of the 741 type. The commencement of the integration and the resetting to zero of the integrators is controlled by the switch-on and switch-off of field-effect transistors. The transfer in the memory is brought about by the switch-on and switch-off of field-effect switches $S_1, S_2 \ldots S_6$, controlled by a ring counter of the number of signals 13.

At the end of each element of a control signal the level reached by integrator 10 is transferred to a capacitative memory unit different for each successive element of the signal 12a, 12b, 12c, 12d, 12e, 12f. The number of these memory units 12a–12f depends on the maximum number of elements forming the control signal.

Thus the value of the duration of each "dash" or "dot" element of the control signal is stored without on the other hand having had its meaning as "dash" or "dot" attributed to it.

In order to determine whether the levels in memory units 12 correspond to a "dash" or to a "dot" the output of the memory unit is passed to level comparators 14a, 14b .... 14f, of which the comparison or reference voltage r common to all the comparators 14 has been stored in 15 from a "$n$ or $1/n$" logic circuit 16, ($n$ being between 2 and 3, preferably having the value 2.3).

At the end of each new signal except during the first when the "$n$ or $1/n$" circuit is blocked by the element counter by a signal $b$, circuit 16 compares the level in the first-signal memory unit 12a with that in integrator 10. If at the end of a signal the voltage in integrator 10 exceeds by $n$ times the value of first-signal memory 12a then it is this value of "$n$ times" which is stored in a principal memory unit 15. If on the other hand integrator 10 has not exceeded $1/n$ times the value of the first sign it is this value of $1/n$ which is chosen as reference voltage $r$ and which is stored in the principal memory unit 15.

If neither of the two above described conditions is reached at the end of a sign, that is to say that the integrator 10 reaches a value between $1/n$ and $n$, no new value is passed to the principal memory unit 15, which maintains the existing reference level r.

The states of comparators 14 and that of signal counter 13 are decoded by a diode matrix 17 in order to select the wanted letter or function before its performance by the typewriter.

By the use of the described equipment the user is obliged neither to follow a fixed rhythm nor to keep to determined lengths of "dots" and "dashes". In fact, the equipment determines by comparison of the signals of a control signal among themselves, which are to be considered as "dashes" and which are to be considered as "dots".

The order to print or carry out the function corresponding to the coded control signal is not made until after some time lag after the end of the last signal, by virtue of a comparator 18, fed by space-duration integrator 11 and by reference voltage $r$, which controls printing circuit 19. The lag before printing is thus proportional to the length of the signals. Circuit 19 also controls circuit 21 for resetting all the circuits to zero.

A supplementary comparator 20 can, if desired, give the order to matrix 17 to cause the typewriter to space when a predetermined delay has elapsed since the last signal. This possibility for automatic space control is provided so that persons who have acquired some skill do not need to repeat the code for "space" at the end of each word.

It can be seen that this assembly of comparator and integrator circuits makes possible the construction of a machine which operates on receipt of short and long signals. There is no necessity to send coded signals of fixed and unalterable duration. If the operator accelerates or decelerates in rhythm, the reference voltage immediately changes and the machine is automatically adapted to the new rhythm without the need for turning any control knob.

This is a very important advantage especially for handicapped persons.

The comparators employ simple operational amplifiers of current type for example the 741, with the two inputs connected to the sources of voltage to be compared. In order to avoid loss of charge of the condensers serving as capacitative memory units, these are connected to field-effect transistors or to integrated circuits having at the input a transistor having a very low current drainage, for example an 8007-type circuit.

Matrix 17 controls directly either the control circuits of electric typewriter 22 or circuits 23 for operating other equipment. Switch equipment 24 controlled by matrix 17 determines whether typewriter 22 or the exterior operating circuits 23 are to be controlled by matrix 17. The exterior circuits can be for example for engaging a radio or TV receiver, the opening of a door, control of lighting, an alarm, etc.

Figure 3:
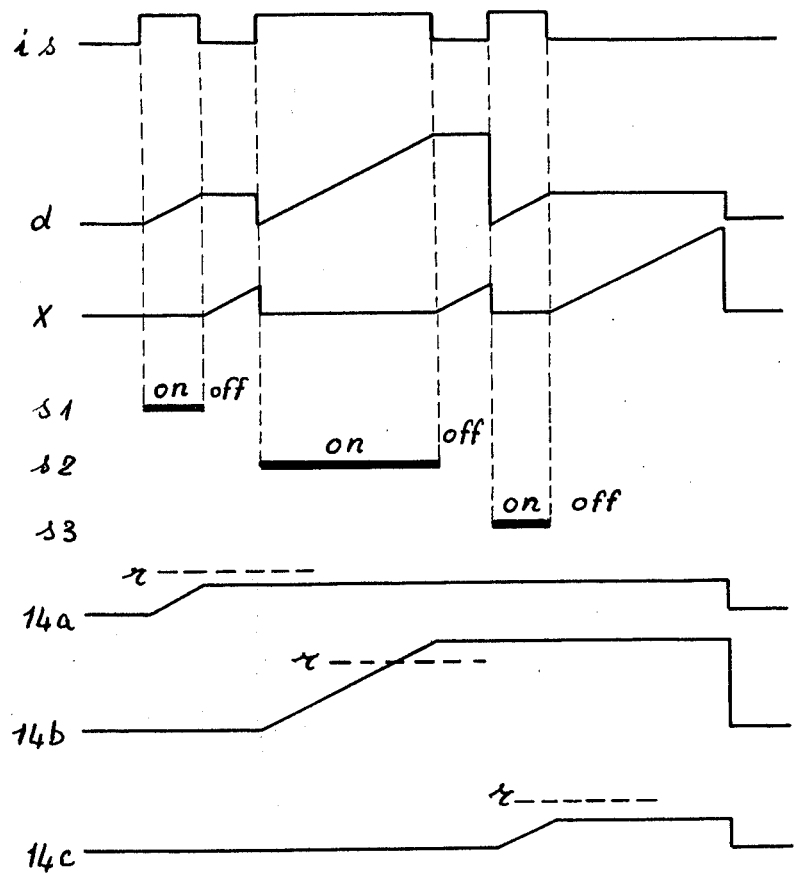
FIG. 3 shows the voltage forms at various points in the block diagram of the control equipment.

FIG. 3 shows for a control signal corresponding to three successive elements "dot"-"dash"-"dot" the forms of output signal in different parts of the control equipment.

In FIG. 3 the horizontal direction represents a time axis and the vertical direction a comparative voltage axis, and the several traces represent graphically the manner of variation with time of the signals which in the description of FIG. 2 are referred to by the symbols appearing at the left of the traces in FIG. 3.

It is clear that it is not necessary to control a typewriter with this control equipment; any kind of machine or function can be controlled.

I claim:

1. A decoding control device for controlling an electrical circuit in response to a coded control signal, comprising a receiver able to receive a control signal having successive short or long elements and comprising at least one short and one long element, identifying means for identifying each element of a control signal so received as short or long by comparison of a signal derived from the element with a reference signal having a value dependent on a signal derived from at least one other element of the control signal, means for producing the reference signal, and means for producing for each element an identifying signal having a value corresponding to the identification of the element as short or long, and a decoder responsive to a permutation of the identifying signals thereby to control an electrical circuit.

2. A decoding control device according to claim 1, wherein the decoder is responsive to each of a plurality of permutations of the identifying signals thereby to control at least one of a plurality of electrical circuits.

3. A decoding control device according to claim 1, wherein the identifying means comprises means for producing for each element a measuring signal having a value dependent on the duration of the element, and means for comparing each measuring signal with the reference signal thereby to produce the respective identifying signal, the means for producing the measuring signal comprising an integrator and the comparing means comprising a comparator.

4. A decoding control device according to claim 3, wherein the means for producing the reference signal comprises means for comparing (a) the value of the first measuring signal with (b) the value of each successive measuring signal corresponding to an element of the control signal, thereby to produce a signal having a value intermediate the said value (a) and the last one of said values (b) which is greater or smaller than said value (a) in a ratio greater than $n$, $n$ being in the range 2–3, the signal so produced being said reference signal.

5. A decoding control device according to claim 4, wherein the means for producing the reference signal comprises a "$n$ or $1/n$" logic circuit, the said first measuring signal is connected to an input of the circuit, and each successive measuring signal is connected to another input of the circuit, the output of the circuit after the last of said measuring signals being the reference signal.

6. A decoding control device according to claim 5, characterised in that it also comprises a memory unit for each element of a signal as well as a principal memory unit which memorises a reference level determined by comparison of the values of the signal elements among themselves.

7. A decoding control device according to claim 1, characterised in that the signal receiver is a microswitch.

8. A decoding control device according to claim 1, characterised in that the signal receiver is a microphone which feeds a high-pass amplifier.

9. A decoding control device according to claim 1, and means for shaping the elements of a control signal and for passing said elements to a receiver, and to an integrator of the duration of the elements.

10. Code control equipment especially for a typewriter intended for handicapped persons comprising a receiver of control signals having short and long impulses, a decoder, and circuits able to control various functions, characterised in that it comprises electronic integrating equipment, memory store equipment and comparison equipment which interprets for each coded control signal the significance of each element of the coded signal so that the control of functions is substantially independent of the rate at which the elements of the coded signal are given, and of their absolute duration.

11. A decoding control device according to claim 10, characterised in that it comprises comparators which compare the levels of each memory with the reference level and which feed a control-signal decoding matrix.

12. A decoding control device according to claim 1, for controling a typewriter, characterised in that it comprises also an integrator of the intervals between elements of a control signal, and a comparator of the reference level and the level reached by this integrator which controls either automatic spacing or the printing of a letter.

* * * * *